(12) United States Patent
Amini

(10) Patent No.: US 6,657,440 B1
(45) Date of Patent: Dec. 2, 2003

(54) PROPAGATION OF WAVES THROUGH MATERIALS

(75) Inventor: Bijan K. Amini, Houston, TX (US)

(73) Assignee: EM-Tech Sensors LLC, Houston, TX (US)

( * ) Notice: Subject to any disclaimer, the term of this patent is extended or adjusted under 35 U.S.C. 154(b) by 0 days.

(21) Appl. No.: 09/332,202

(22) Filed: Jun. 12, 1999

Related U.S. Application Data

(60) Provisional application No. 60/088,955, filed on Jun. 11, 1998.

(51) Int. Cl.[7] .............................................. G01R 27/32
(52) U.S. Cl. ........................ 324/639; 324/637; 324/645
(58) Field of Search ................................ 324/545, 659, 324/768, 639, 642, 663, 631, 637, 645; 355/80, 71; 438/31, 487, 676, 707, 746, 788; 257/245, 728, 625, 440

(56) References Cited

U.S. PATENT DOCUMENTS

| | | | |
|---|---|---|---|
| 3,574,458 A | * | 4/1971 | French |
| 3,617,779 A | * | 11/1971 | Rosenberg |
| 3,851,236 A | * | 11/1974 | Dennhardt |
| 3,995,835 A | * | 12/1976 | Cichy |
| 4,679,936 A | * | 7/1987 | Gerharz |
| 5,038,107 A | | 8/1991 | Gianzero |
| 5,065,100 A | | 11/1991 | Vail |
| 5,132,623 A | | 7/1992 | Dc |
| 5,150,446 A | * | 9/1992 | Penner |
| 5,260,661 A | | 11/1993 | Vail |
| 5,283,520 A | | 2/1994 | Martin |
| 5,426,367 A | * | 6/1995 | Martin |
| 5,633,182 A | * | 5/1997 | Miyawaki |
| 5,654,639 A | | 8/1997 | Locatelli |
| 5,668,475 A | | 9/1997 | Orban |
| 5,698,982 A | | 12/1997 | Mitchell |
| 5,751,144 A | | 5/1998 | Weischedel |
| 5,869,968 A | | 2/1999 | Brooks |
| 5,892,361 A | | 4/1999 | Meyer, Jr. |
| 5,892,460 A | | 4/1999 | Jerabek |
| 5,942,894 A | | 8/1999 | Wincheski |
| 5,966,013 A | | 10/1999 | Hagiwara |
| 5,969,254 A | | 10/1999 | Yamaguchi |
| 6,008,657 A | | 12/1999 | Suyama |
| 6,025,721 A | | 2/2000 | Vail |
| 6,084,403 A | | 7/2000 | Sinclair |
| 6,097,532 A | * | 8/2000 | Harris |
| 6,100,696 A | | 8/2000 | Sinclair |
| 6,127,823 A | | 10/2000 | Atherton |
| 6,157,195 A | | 12/2000 | Vail |
| 6,163,155 A | | 12/2000 | Bittar |

OTHER PUBLICATIONS

In–Line Inspection Technolgies for Mechanical Damage and SCC in Pipelines. Final Report on Tasks 1 and 2. U.S. Department of Transportation, Office of Pipeline Safety. Contract No. DTRS56–96–C0010 Dec. 1988.

* cited by examiner

Primary Examiner—Kamand Cuneo
Assistant Examiner—Trung Nguyen
(74) Attorney, Agent, or Firm—David McEwing

(57) ABSTRACT

A method for creating a full or partial transparency in a material comprising the steps of creating a first electromagnetic wave adjacent to the material, saturating the material with the first electromagnetic wave, creating a second electromagnetic wave having a frequency higher than the first electromagnetic wave, engaging the second electromagnetic wave with the material when the material is saturated for creating a transparency in the material with respect to the electromagnetic waves. An apparatus for creating a transparency in a material comprising a large coil, a small coil, a switch, a low noise amplifier (LNA), a receiver, a frequency generator, a pulsar, at least one or more capacitors and a power source.

27 Claims, 18 Drawing Sheets

PROPAGATION OF WAVES THROUGH MATERIALS

CROSS REFERENCE TO RELATED APPLICATIONS

The present application is a continuation-in-part application of the application of Bijan Amini, U.S. Ser. No. 60/088,955, filed Jun. 11, 1998, entitled DYNAMICALLY COUPLING TO VARYING SPACTIL AND TEMPORAL PERMEABILITY IN FERROMAGNETIC MATERIALS FOR ENHANCING TRANSMISSIVE ELECTROMAGNETIC MEASUREMENTS.

FIELD OF THE INVENTION

The present invention relates generally to "seeing" through materials. Specifically, the present invention relates to using electromagnetics to "see" through materials. Further, the present invention relates to determining the characteristics of other materials in the vicinity of the materials through which the present invention has seen.

BACKGROUND OF THE INVENTION

There are many examples of the use of electromagnetics (EM) for sensing and measurements. However, this sensing is usually limited by barriers that are conductive electrically or are ferromagnetic. This is the case in EM sensing through steel tanks, pipelines, well casings and the like. There has long been a need for a device that can make metallic and related barriers transparent. Also, there has been a long felt need for a device that can make barriers transparent with respect to sufficient frequencies of EM waves to achieve useful measurements. A brief list of specific applications that would be possible using a technology that can make barriers transparent with respect to sufficient frequencies of EM waves to achieve useful measurements is provided. For example in an oil well, there are many characteristics of the geology that can be determined by EM waves. Particularly, resistivities of the formation, detection of water in an advancing waterfront due to water drives or water reinjection, mapping, near and far field casing cement resistivity, casing corrosion, reservoir mapping, radar for ground penetration, and the like. These EM measurements are usually done in an uncased well. Well casing is typically ½ inch thick steel tubing from 5 inches to 9 inches in diameter.

Problem application areas include, for example, the following:
1. Cased well resistivity measurements.
2. Through storage tank liquid level measurements.
3. Through pipeline resistivity measurements.
4. In pipeline corrosion measurements using a "pig."
5. Refinery and tank farm corrosion measurements.
6. Testing for metal permeability as an indication of its quality.
7. Electrical property measurements originating above or in the ground for characteristic measurements of related media.

It is well known that EM energy is absorbed by ferromagnetic materials because the molecules respond to an EM wave and their response requires energy. Ferromagnetic steel casing has a permeability of about 2,000 to 10,000 depending on the steel. The higher the permeability, the greater the absorption of EM energy. On the other hand, non-ferromagnetic materials such as aluminum, copper, stainless steel and air have permeabilities of 1. Transmitting an EM wave through aluminum however is much different than transmitting an EM wave through air Since aluminum is an excellent electrical conductor, in the near field to an electromagnet the magnetic field predominates. The fact that the magnetic field predominates allows the signal to penetrate the material, e.g., aluminum. Both near and far field signals through the aluminum will experience attenuation because the electrical conductivity of the aluminum generates eddy currents that dissipate the electric component of the EM wave and the movement of the field with respect to time. The case of seeing through ferromagnetic materials has been attempted, but has not been successful. See U.S. Pat. No. 5,038,107.

The situation changes dramatically when the aluminum is replaced by a ferromagnetic material, such as for example, carbon steel. The much higher steel permeability readily dissipates even the near magnetic field. However, the physics of the situation allows some room to overcome this limiting situation. As the magnetic field is increased, more and more of the ferromagnetic material's atoms begin to line up uniformly in response to the magnetic field. If the magnetic field is increased sufficiently, all of the atoms throughout the thickness of the material will align themselves with the magnetic field. This state is called magnetic saturation of the material. During magnetic saturation, the ferromagnetic materials cannot absorb any more EM energy. In this saturation state, the permeability of the material approaches one. Thus in the saturation state, the permeability of the material approaches the permeability of aluminum or air. Naturally, in the case of ferromagnetic materials as with aluminum, it is still an electrical conductor so the electric component of the EM wave is damped to some extent by eddy currents generated in the material. During this full or partial magnetic saturation, the portion of the material that is fully saturated or partially saturated could become fully or partially transparent for the transmission of a second EM wave, The geometry of this partially transparent region is important The term saturation will be used throughout this invention as both fully and partially saturated as with transparency which will mean fully or partially transparent.

It is, therefore, a feature of the present invention to see through materials, ferromagnetic and nonferromagnetic.

Another feature of the present invention to determining the electrical properties of materials in the vicinity of a material that has been seen through.

A feature of the present invention is to provide resistivity measurements through ferromagnetic casing in oil wells.

Another feature of the present invention is to provide resistivity measurements through ferromagnetic tubing and casing simultaneously.

Another feature of the present invention is to provide detection of liquid interfaces in tanks.

Another feature of the present invention is to provide resistivity and sediment detection in refinery tanks and pipes.

Yet another feature of the invention is to provide flow rate and resistivity measurements in pipelines without using hot taps or other intrusive methods.

Still another feature of the present invention is the measurement of outside casing cement conditions from inside casing or tubing.

Another feature of the present invention is to provide logging through casing and tubing in an oil well.

Another feature of the present invention is that it provides non-contacting arrangement with the surface of the associated material.

Still another feature of the present invention is that surface conditions are not important because inductive fields do not require contact and can be done at a distance.

Additional features and advantages of the invention will be set forth in part in the description which follows, and in part will become apparent from the description, or may be learned by practice of the invention. The features and advantages of the invention may be realized by means of the combinations and steps particularly pointed out in the appended claims.

SUMMARY OF INVENTION

To achieve the foregoing objects, features, and advantages and in accordance with the purpose of the invention as embodied and broadly described herein, a method for creating a transparency in a material comprising the steps of creating a first electromagnetic wave adjacent to the material, saturating the material with the first electromagnetic wave, creating a second electromagnetic wave having a frequency higher than the first electromagnetic wave, engaging the second electromagnetic wave with the material when the material is fully or partially saturated for creating a transparency in the material with respect to the electromagnetic waves. An apparatus for creating a transparency in a material comprising a large coil, a small coil, a switch, a low noise amplifier (LNA), a receiver, a frequency generator, a pulser, at least one or more capacitors and a power source.

BRIEF DESCRIPTION OF THE DRAWINGS

The accompanying drawings which are incorporated in and constitute a part of the specification, illustrate a preferred embodiment of the invention and together with the general description of the invention given above and the detailed description of the preferred embodiment given below, serve to explain the principles of the invention.

The above general description and the following detailed description are merely illustrative of the generic invention, and additional modes, advantages, and particulars of this invention will be readily suggested to those skilled in the art without departing from the spirit and scope of the invention.

DETAILED DESCRIPTION OF THE PREFERRED EMBODIMENTS

Reference will now be made in detail to the present preferred embodiments of the invention as described in the accompanying drawings.

For the magnetic transparency to be useful, it must have an area greater than the most energetic field lines of the secondary signal source that is desired to transmit through the magnetic transparency. Moreover, the larger this magnetic transparency area becomes, the more power is required to establish the transparency. The power required is substantial. Until recently, such power was not available nor were the switches to turn it on.

Figure 1:
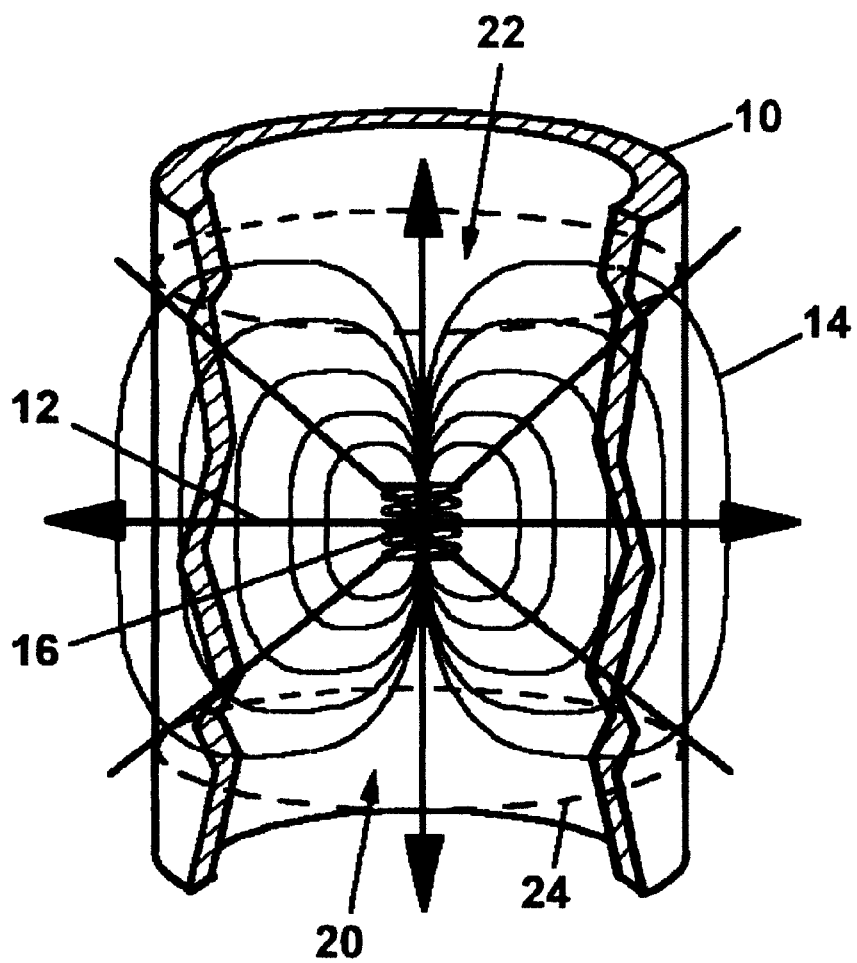
FIG. 1 illustrates the secondary signal field line geometry with respect to the size of a magnetic transparency.

FIG. 1 illustrates the secondary signal field line geometry with respect to the size of magnetic transparency. The magnet required to create the magnetic transparency is not illustrated. However, one embodiment of a geometry is shown. FIG. 1 is illustrated with a casing 10 having a secondary signal source 16. The FM signal propagation 12 is illustrated at right angles to the central axis of the casing 10. The secondary source magnetic field lines 14 are illustrated propagating symmetrically from the central axis of the casing 10. A magnetic transparency 20 is created by the primary source (not illustrated) creating a magnetic transparency 20. The magnetic transparency 20 has an upper boundary 22 and a lower boundary 24.

Figure 2:
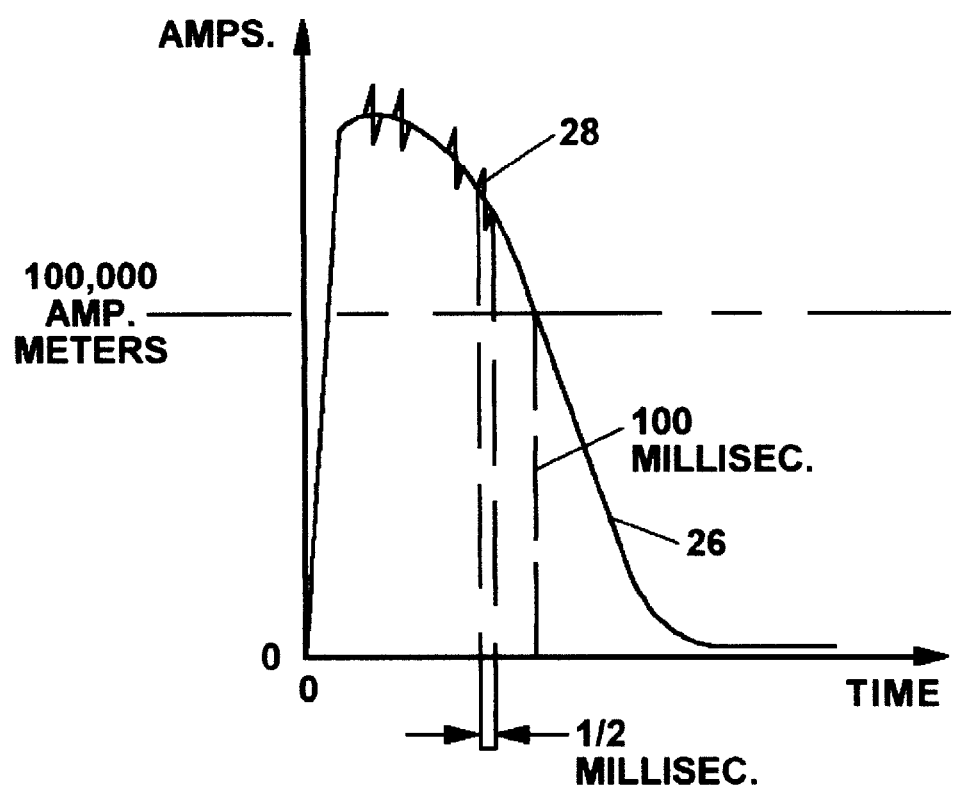
FIG. 2 shows one version of the primary magnet core signal with a superimposed higher frequency signal on the current needed to create the transparency.

FIG. 2 illustrates the graph of current versus time with respect to the present invention. Illustrated on the graph are the secondary coil discharge spikes 28 disposed along the main coil discharge coil 26. FIG. 2 shows one example of a primary magnet core signal 26 with a superimposed higher frequency signal 28 on the primary magnet core signal 26 needed to create the transparency. This higher frequency signal would be generated by a smaller coil wrapped on the larger coil or near the larger coil. The high frequency signal is assumed to be pulsed at less than 10 milliseconds rates. The lower frequency generated by the coil that creates magnetic saturation lasts for 10 milliseconds. Therefore, there is sufficient time for the high frequency pulse to go out to a target and return traveling at 10 nanoseconds per meter in soil.

In practicing the present invention, there may be many cases in which high concentrations of magnetic flex are needed. It is important that the flux be anisotropic in its direction. That is, it may be necessary to have the flux be directionally concentrated. Moreover, the average electrical power consumption may be kept very low while the flux densities may be many thousands of Gauss per square centimeter.

There are many geometries possible to achieve very high concentrations of directional flux. In each such device flux will be pushed into the direction where there is not a magnet.

Figure 16:
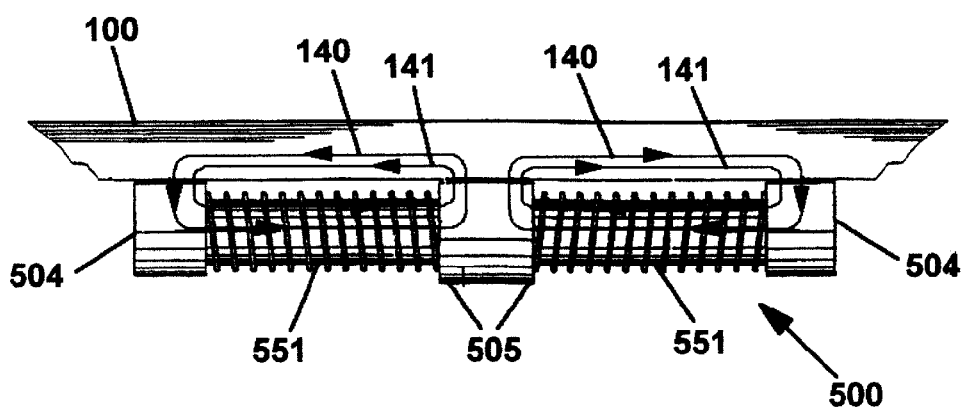
FIG. 16 is a one-dimensional flux culminator of the present invention.
Figure 17:
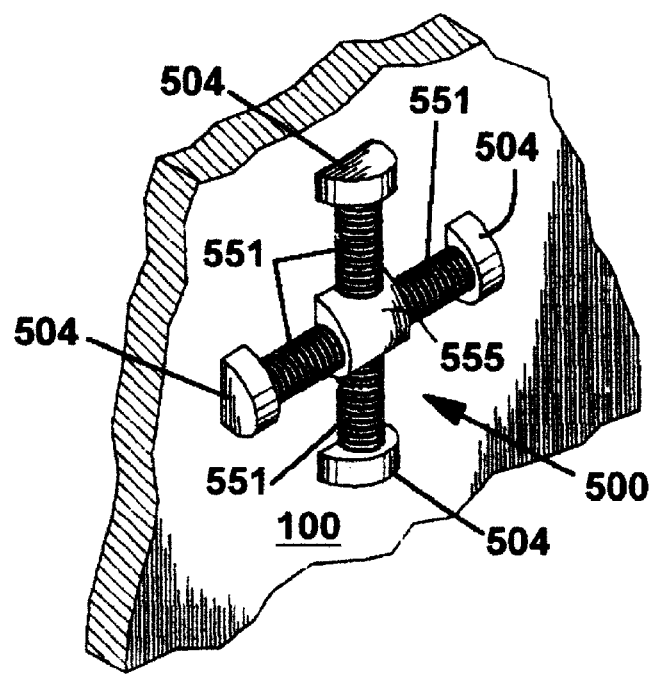
FIG. 17 is a two-dimensional cross-flux culminator of the present invention.
Figure 18:
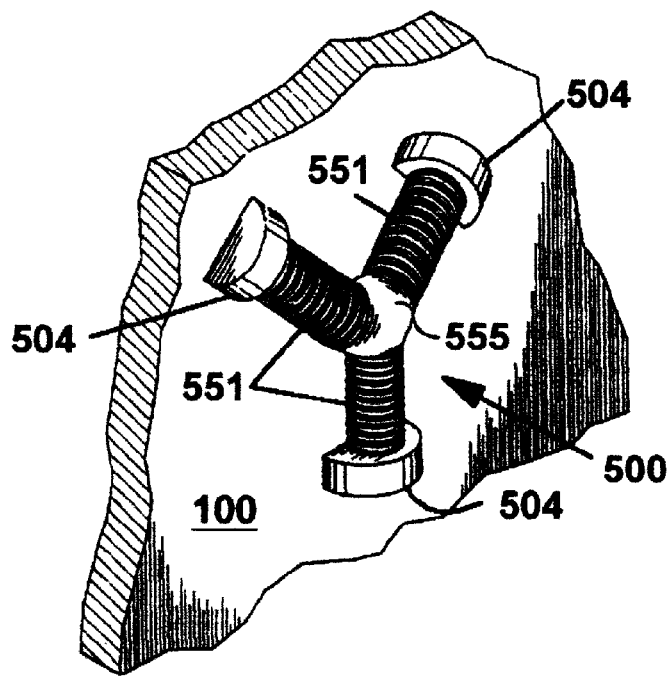
FIG. 18 is a two-dimensional star-flux culminator of the present invention.
Figure 19:
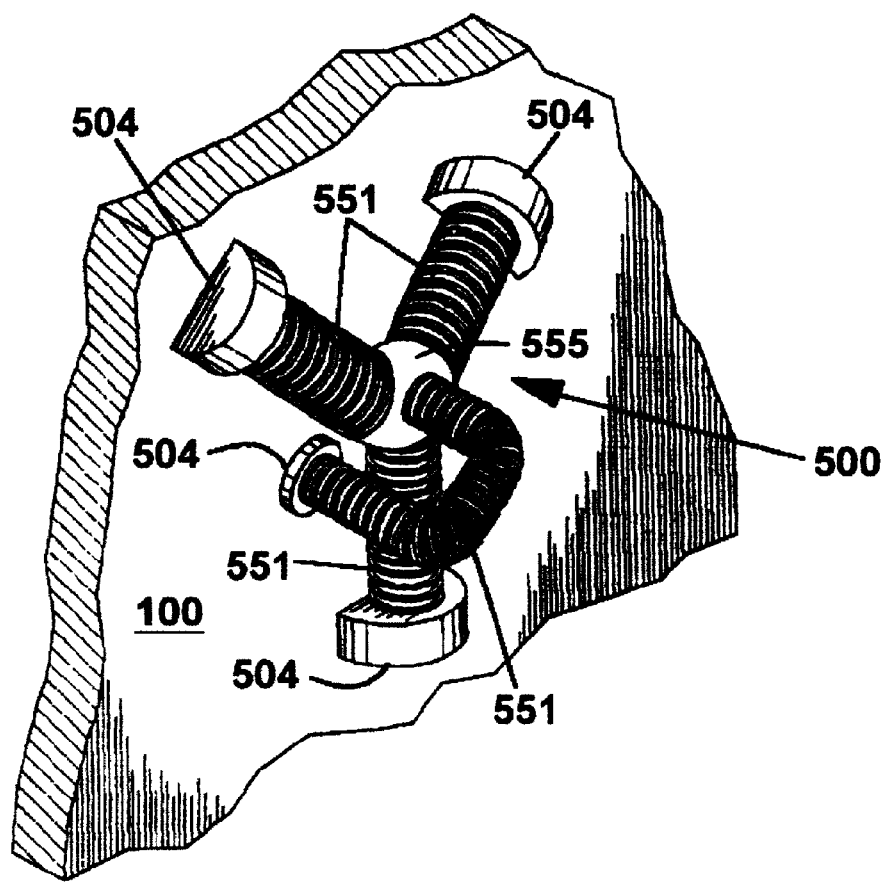
FIG. 19 is a three-dimensional star-flux culminator of the present invention.

FIG. 16 is a one-dimensional flux culminator 500 of the present invention adjacent to a barier material 100. The one-dimensional flux culminator 500 has magnetic flux lines 140, 141 and pole orientations "N" 505 and "S" 504. FIG. 17 is a two-dimensional cross-flux culminator 500 of the present invention adjacent to a barrier material 100. The four like poles 504 are connected to four different cores 551. The opposing magnetic poles contained within a single mass 555. FIG. 18 is a two-dimensional star-flux culminator 500 of the present invention. The two-dimensional star-flux culminator 500 is adjacent to the barrier material 100. The three like poles 504 are connected to three different cores 551. The opposing magnetic poles contained within a single mass 555. And, FIG. 19 is a three-dimensional star-flux culminator 500 of the present invention. The three-dimensional star-flux culminator 500 is adjacent to the barrier material 100. It is appreciated that the material 100 could be different and the pole orientations "N" 504 and "S" 555 could be interchanged. The four like poles 504 are connected to four different cores 551. The opposing magnetic poles are contained within a single mass 555.

The culminator size is determined by the product of target metal to be saturated or magnetically coupled to. The culminator must never become saturated. The mass and permeability's of inducers, cores and flanges, must be large enough to never become saturated. All magnets must be designed so that flux concentration maximums are within the culminator. And all magnetic flux paths must be complete, i.e., no path must have an air or low permeability gap in it except in the target metal.

For most applications, a power source of 300 watts or less is sufficient to create the signal and saturation. For thicker material, strong pulses and signals are generated by charge storing capacitors. These capacitors are slowly charged than quickly discharged through a switch contact and then through the low impedance large coil. At the same time, the higher frequency small signal coil is pulsed.

Figure 3:
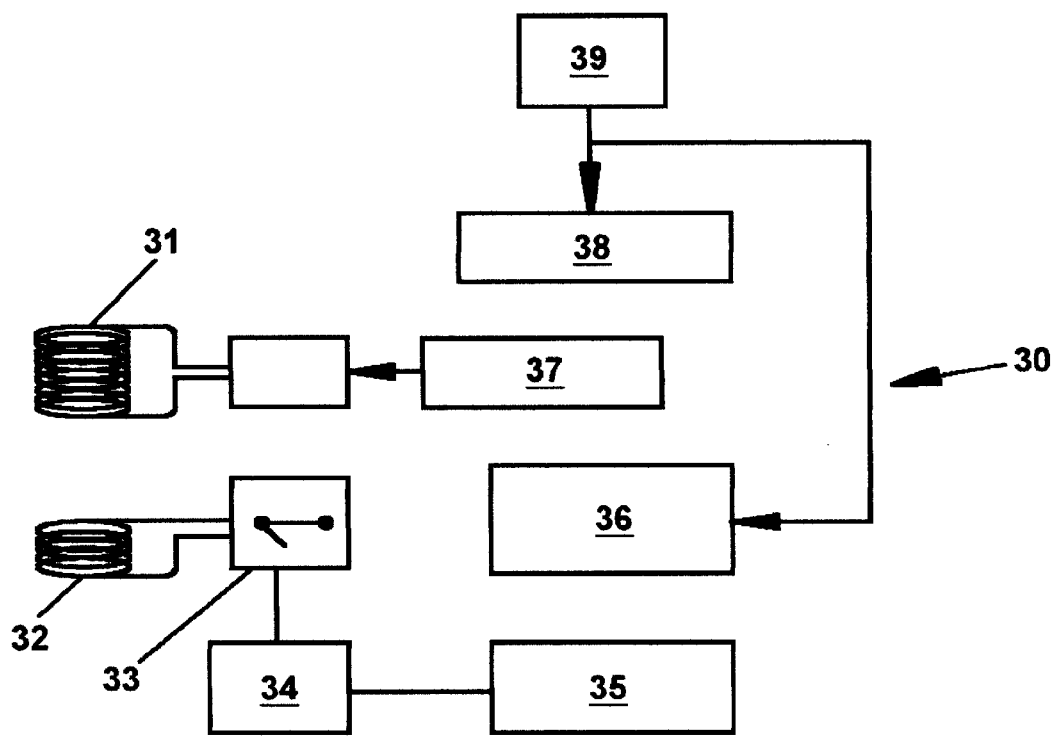
FIG. 3 is a block diagram of one embodiment of the present invention.

FIG. 3 is a block diagram of one embodiment of an apparatus of the present invention. FIG. 3 illustrates an embodiment 30 of the present invention. The embodiment 30 comprises a large coil 31, a small coil 32, a switch 33, a low noise amplifier (LNA) 34, a receiver 35, a frequency generator 36, a pulser 37, one or more capacitors 38 and a power source 39.

Calculations and experiments have shown a significant transmitted pulse spreading as it passes through the casing and into the soil. This spreading is due to a transfer function that can be found by mathematical normalization of a measured transmitted pulse to the measured received pulse. The frequency resulting from the spreading and the amount of spreading are themselves used as a measurement tool for the properties of the material through which the pulses are spreading.

The orientation of the transmitter and receiver coils is important with respect to the axis of the saturating coil, the object to be measured, and the distance to the object. Additional advantages and modification will readily occur to those skilled in the art. The invention in its broader aspects is therefore not limited to the specific details, representative apparatus, and the illustrative examples shown and described herein. Accordingly, departures may be made from the details without departing from the spirit or scope of the disclosed general inventive concept.

Many uses exist for the ability to send an EM wave through a ferromagnetic material in order to measure EM properties of materials on the other side. Examples are through storage tank water level measurement, detection of water and other conductive liquids in a pipeline, through casing resistivity measurements in an oil or gas well, corrosion detection inside storage containers, and many others. Reducing permeability by magnetic saturation is well known. Others have used saturating currents to reduce the permeability of the ferromagnetic casing material for oil well logging using only fixed geometry, time invariant saturation. The production tubing must be removed and the transmitter and receiver must be in the same saturated area. (See U.S. Pat. No. 5,038,107). The principles discussed herein, however, will show how the ferromagnetic material may be itself used to enhance the measurement. This will be done by (1) different degrees of saturation that can (2) vary spatially and (3) temporally with (4) transmitter-receiver in separate saturated zones which are (5) nulled electronically. These variations can create magnetic flux concentrations as in a lens.

It has been determined that there are five (5) important factors in the system design for a particular use of these partially or full saturated ferromagnetic materials called in brief "magnetic transparency." These factors are as follows:
1. Design of the magnetic transparency:
2. The volume of material to be measured with respect to its electrical properties must be much larger to minimize the effects of a change in properties of the transparency material (barrier), e.g., thickness varies due to corrosion, welds, etc. This is to make such measurements possible, otherwise material properties would be dominated by changes in the transparent material properties.
3. Possible spatial distributions and locations of the magnetic transparency.
4. Possible temporal variations in opening and closing the magnetic transparency.
5. Nulling techniques to eliminate between the transmitters and receivers direct signal coupling.
6. Controlled partial reduction in permeability to create magnetic lensing.

Each of these will be discussed below.
1. Design of the Magnetic Transparency:
  There are two (2) aspects to the magnetic transparency design. These are:
  (a) Method of design for saturation or partial saturation for creating a magnetic transparency.
  (b) Geometric considerations of magnetic transparency size to receiver or transmitter location within the magnetic transparency. The flux loop can only achieve saturation at the point of desired transparency. Thus, $$(Vol)(permeability)_{mag.flux\ circuit>>}(Vol)(permeability)_{targets}+(Vol)(permeability)_{airgaps}\times 1$$

2. Method of design for saturation or partial saturation for creating a magnetic transparency:

With respect to full saturation, the volume of the ferromagnetic material to be saturated times permeability must be calculated. Then, the inducer volume must be greater than the volume of the material. For the magnetic flux to be contained and guided to the ferromagnetic material to be saturated, the product of the volume and permeability of the inducer must be kept high in relation to the product of the volume and permeability of the transparency and associated air gap. The product of the volume and permeability of the inducer must be greater than the product of the volume and permeability of the transparency region Such an embodiment is shown in FIG. 4.

Figure 4A:
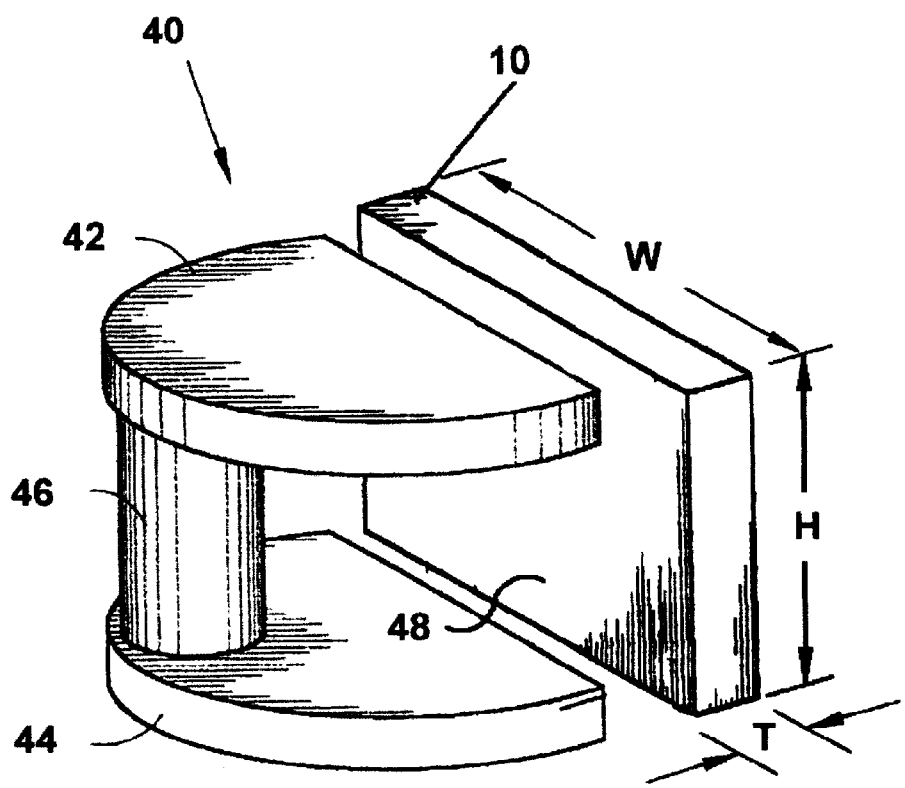
FIG. 4 illustrates one embodiment of the inducer used in practicing the present invention, and particularly, for containing flux lines to completely or partially saturate the transparency region.
Figure 4B:
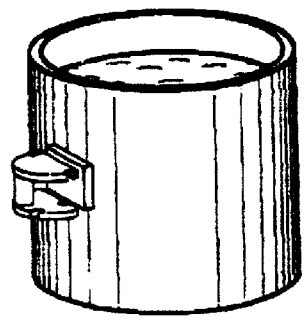

FIG. 4 illustrates one embodiment of the inducer used in practicing the present invention, and particularly, for containing flux lines to completely saturate the transparency region. FIG. 4 illustrates one embodiment of an inducer 40 for use with the present invention. The inducer 40 comprises a top flange 42, a bottom flange 44 and a core 46. The core 46 is located between the top flange 42 and bottom 44. The tank 10 is illustrated such that a width W, a height H and a thickness T. The inducer 40 provides a magnetic transparency 48 in association with the tank 10.

Partial saturation cases may be appropriate where all of the energy transmitted is not desirable to go through the transparency. Energy can be retained in the material in the form of eddy currents to generate sensitivity in the material for field effects, e.g., tank gauging. Thus, if part of the material is effected, the effect can be measured. Using the principle of partial saturation, magnetic antennas can be created. Thus, an inducer midway in a tank can detect fluid in the bottom of the tank.

There are cases in which the presence of the large unsaturated core near the transmitter receiver is not desirable. In such cases, the core may be driven into saturation while the end flanges are designed to not go into saturation. It is known to those skilled in the art that there are varying combinations of these effects that may be used depending upon the application.

3. Geometric considerations of transmitter-receiver location with respect to the magnetic transparency.

Figure 9A:
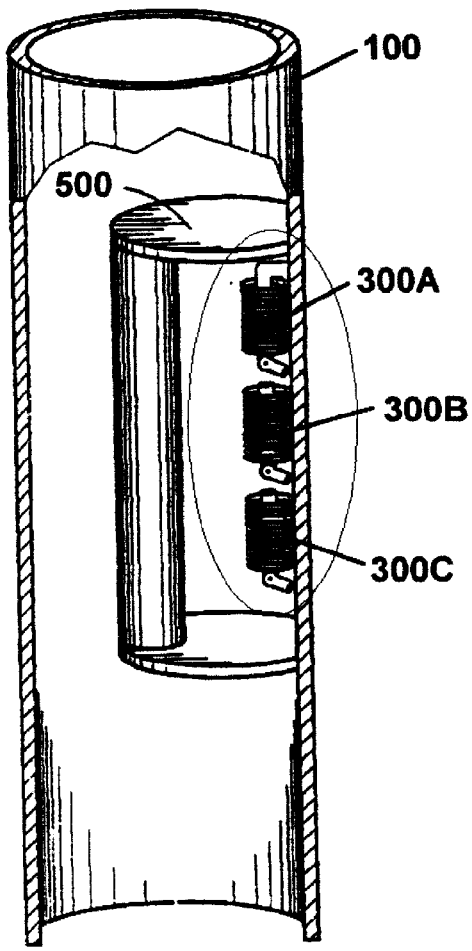
FIG. 9 is another embodiment of the present invention illustrating schematically the near-field resistivity profiling using contact switches to change penetration depth.
Figure 9B:
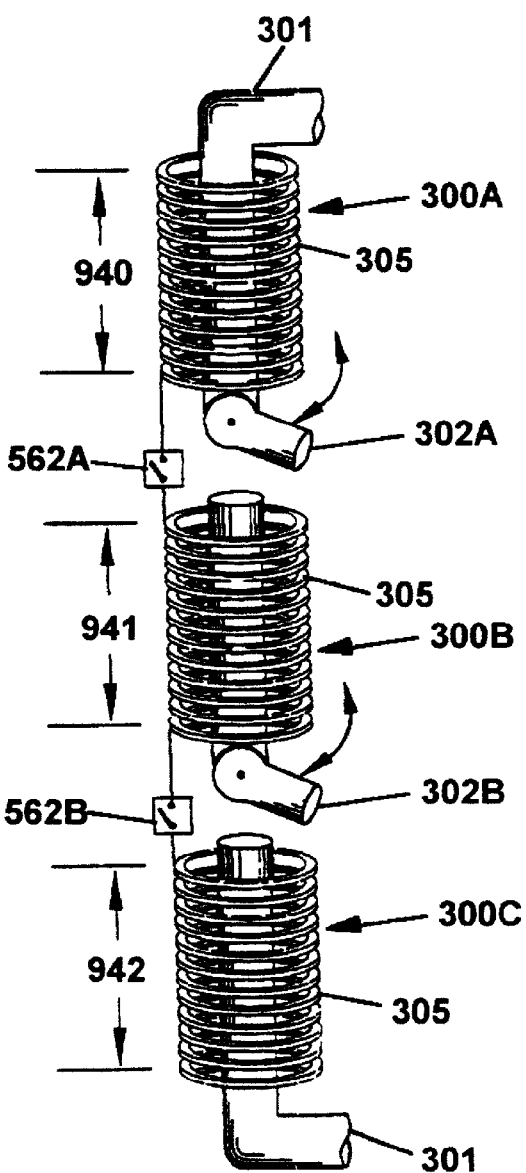
Figure 10A:
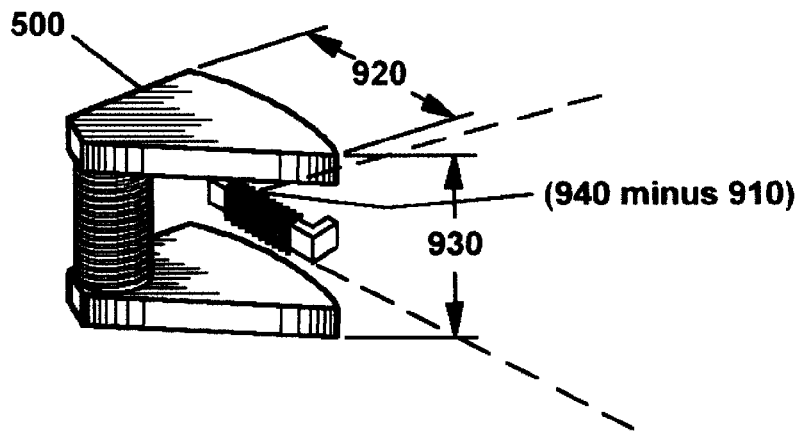
FIG. 10 and FIG. 10A illustrate an inducer for practicing the present invention and the geometry of field considerations for directional transmission coils to be measured through near wall with respect to the saturated area.
Figure 10B:
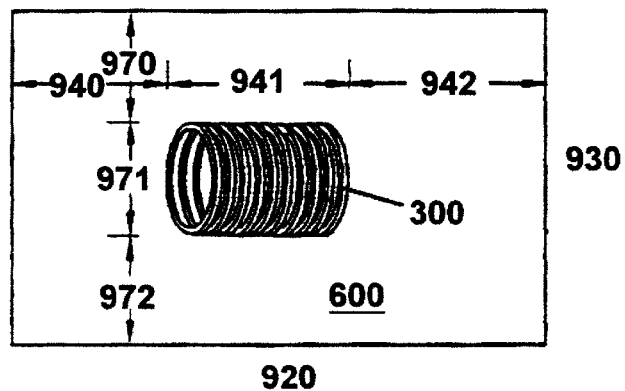

The geometric considerations of transmitter-receiver location with respect to the magnetic transparency means that depending upon whether it is through-tank level gauging or through-well casing logging or some other application, the transmitter receiver design and location can vary. See FIGS. 5, 6, 7 and 8 for examples. Therefore, by not wrapping either or both the transmitter or receiver coils around the saturation inducer core allows a number of advantages. These are:

1. Mechanical nulling by receiver or transmitter placement or rotation with respect to each other, or with respect to material.
2. Directionality by being nearest tank side of core, or by rotation of the axis of the transmitter or the receiver.
3. No danger of saturating the inducer core and allowing dispersion of magnetic field lines. However, applications of partial saturation may be desirable to take core and walls out of total saturation. This is exactly opposite the concern from cited U.S. Pat. No. 5,038.107 which does not want to use an AC current on the core that may take the walls or core out of saturation.
4. Since the transmitter coil can have an air core, laminated core or smaller inductor core than the saturating inducer core, much higher frequencies can be used since the inductive impedance due to the presence of a large metallic core drives up the total impedance.
5. Multiple transmitters each at a very different frequency may be used broadcasting simultaneously to perform spectroscopy over a large frequency range.
6. In the same saturated zone, coils of different lengths will have different field lines and can therefore penetrate the surrounding media by the coil length for profiling the near media. This concept is shown for the near field in FIGS. 9A and 9B. FIGS. 9A and 9B illustrate an additional embodiment where the penetration distance outside of a casing 100 is increased proportionally with the length of the coils 305. FIG. 9A illustrates the concept of using the transmitter coils 305 of the same or variable lengths. Three separation transmitters 300A, 300B and 300C are placed within an inducer 500. The inducer 500 is placed inside the well casing 100. FIG. 9B illustrates that the separate transmitter coils 305 can be converted by closing one or more switches 562A, 562B thereby creating a signle transmitter coil having the combined length of the sum of the length of the coils in each transmitter 300A, 300B and 300C, illustrated as the lengths 940, 941, and 942, respectively, of the transmitter coils 305. The transmitter core 301 is optional and may be increased by closing the switches 302A, 302B. It is appreciated by those skilled in the art that additional tranmitters may be used as well as, for example, a single combination of two transmitters 300A, 300B without using the third transmitter 300C. In FIGS. 9A and 9B, the well casing penetration example is used but the technique is equivalent for through tank level gauging, pipelines and other related cases. For the field the separation of the magnetic transparences by some length between the transmitter and receiver coil will cause penetration by the separation distance.
7. For the case of full saturation, the length of the magnetic transparency to be saturated needs to encompass some portion of the transmitter or receiver. Otherwise, a large amount of the magnetic flux is absorbed into the non-saturated high permeability material. This concept is shown in FIGS. 5–10A, and 10B. FIGS. 10A and 10B illustrate the geometry of field considerations for placement and size of the transmitter in relation to the area of the volume region to be saturated. FIGS. 10A and 10B illustrate an embodiment of the invention that uses the placement of the inducer 500, and particularly, the transmitter 300 in the center of the transparency or partial transparency volume region of the target material 600. The target material 600 has a width 920 and a height 930 as illustrated in FIG. 10A. It will also be appreciated by those skilled in the art that the transmitter 300 may be used with a receiver (not shown). It will further be appreciated that placement of the transmitter 300 in the geometric center of the area that is partially transparent will optimize the symmetry or provide other benefits in regard to, for example, magnetic antenna or magnetic lensing effects.
8. Multiple transmitters can be used to "buck" each other so as to push flux lines far out into the material.

9. Multiple receivers can be either nulled with respect to each other and/or built into an array for improving signal receiving resolution.

Figure 5:
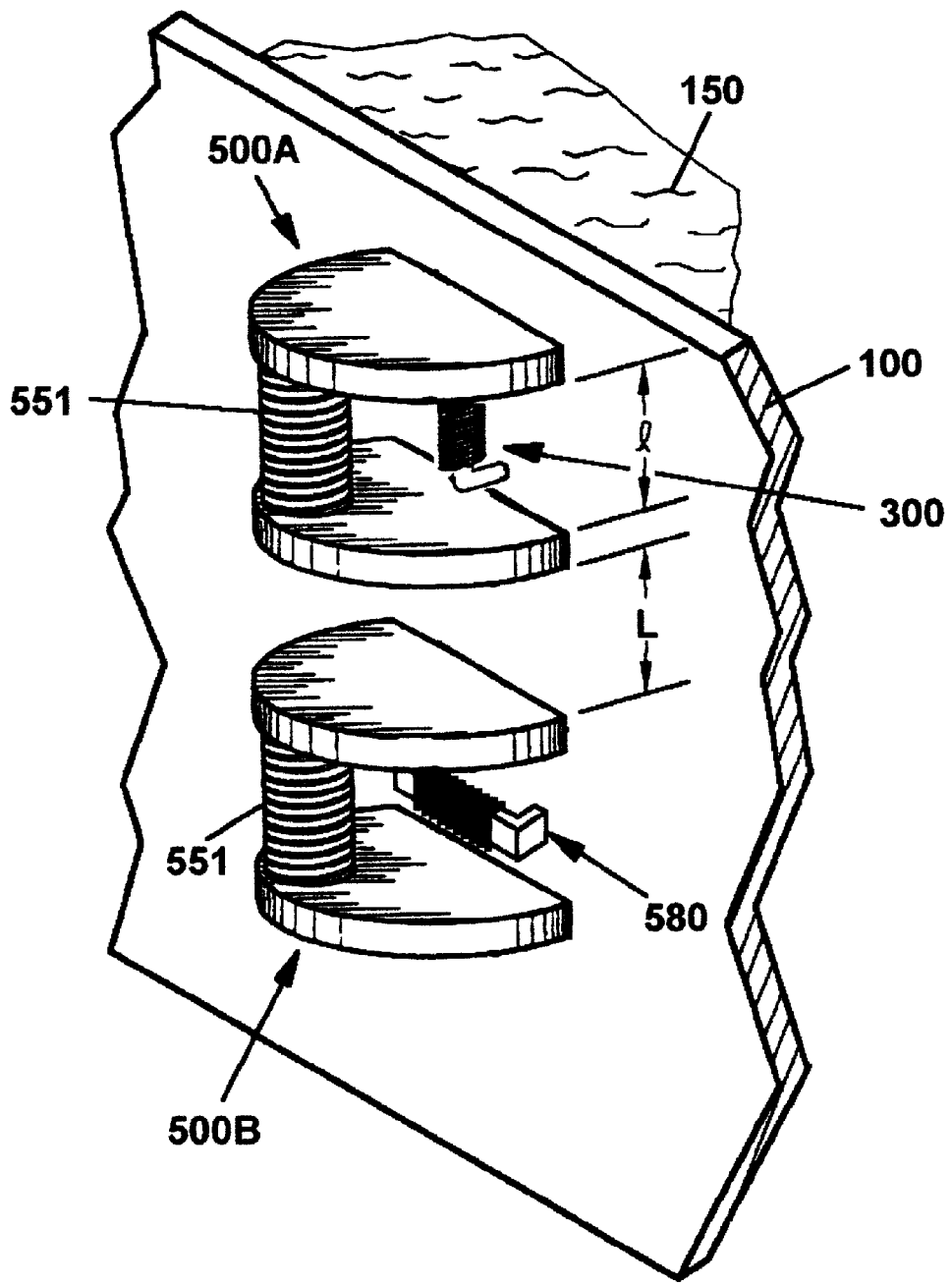
FIG. 5 is an illustration of one embodiment of a transmitter and receiver configuration used in practicing the present invention.

FIG. 5 is an illustration of one embodiment of a transmitter 500A and receiver 500B configuration used in practicing the present invention. The transmitter/receiver 500A/500B orientation being one-above-the-other provides effective use of the present invention for through-tank determination of fluid 150 levels. The saturated coil length 551 is noted by "I." The separation between the transmitter 500A and receiver 500B is indicated by "L." The separation "L" acts as a null since the tank wall 100 is not saturated. Also, the receiver coil 580 is rotated at an orientation 90 to that of the transmitter coil 300. Thereby, acting as a null to direct the transmitter-receiver coupling.

Figure 6:
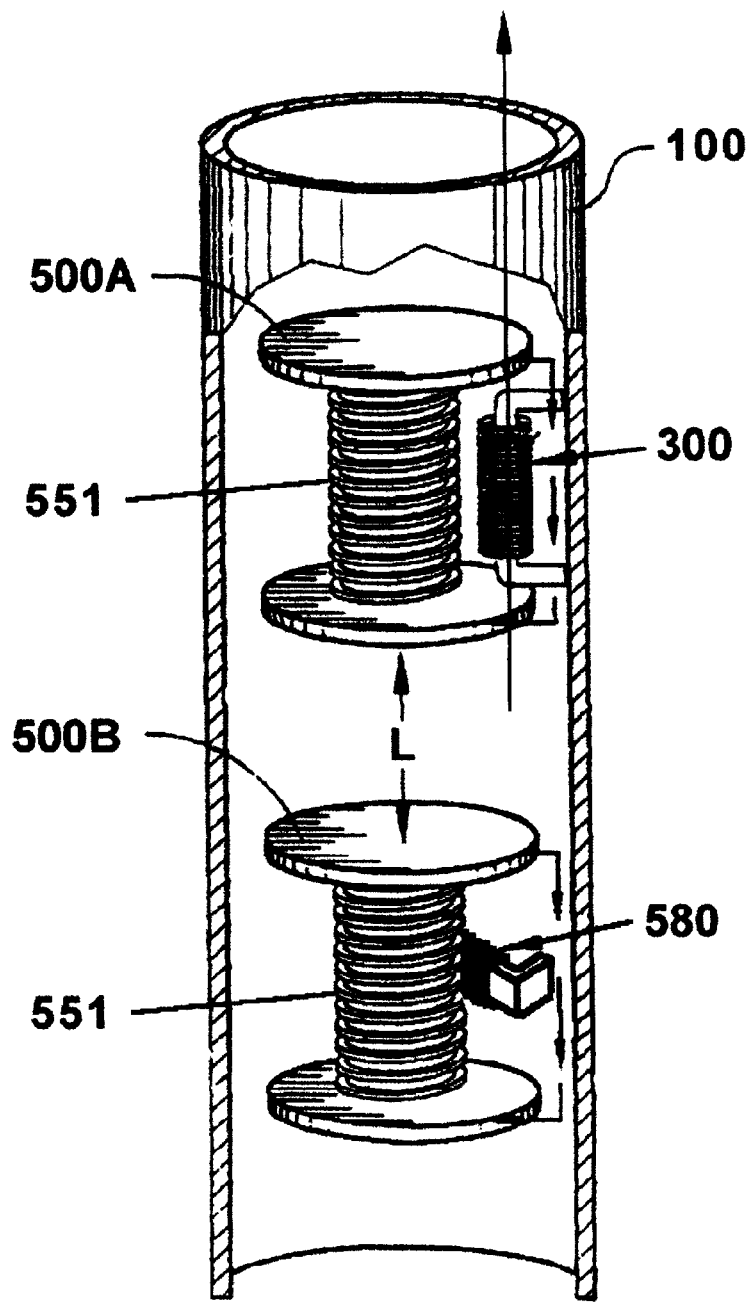
FIG. 6 is another embodiment of the present invention for use with well logging through a casing.

FIG. 6 is another embodiment of the present invention for use with well logging through a casing. FIG. 6 illustrates two inducers 500A, 500B displaced by distance L within a wall placing 100. The arrangement provides for the use of the present invention in association with wall logging through the casing 100.

Figure 7:
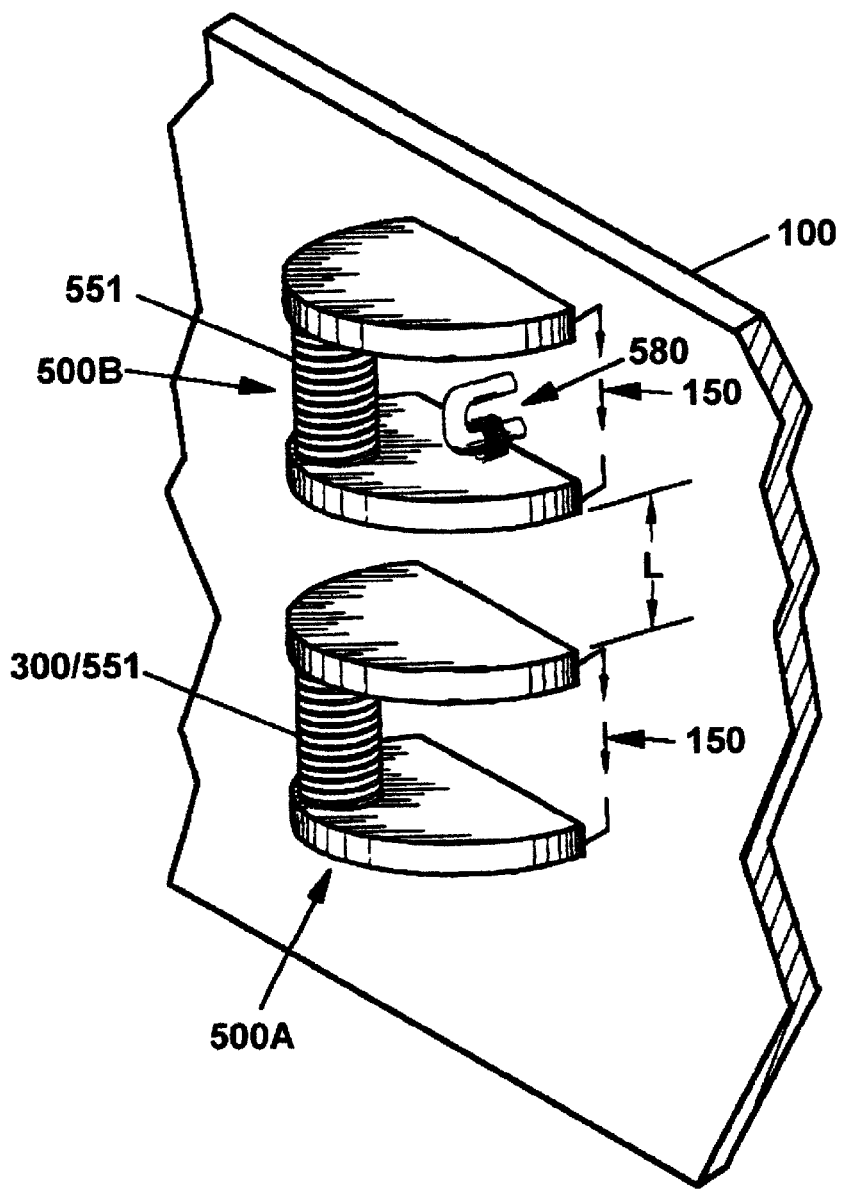
FIG. 7 illustrates yet another embodiment of the present invention where the transmitter and the saturating coil are similarly orientated and an off-core receiver is to be rotated 90°.

FIG. 7 illustrates yet another embodiment of the present invention where the transmitter 300 and the saturating coil 551 are similarly orientated and an off-core receiver 580 is rotated 90°. The arrangement illustrated in FIG. 7 provides for a non saturated section L of the wall 100 to be between the inducers 500A, 500B. The saturating magnetic flux 150 is also illustrated for a saturated section.

Figure 8:
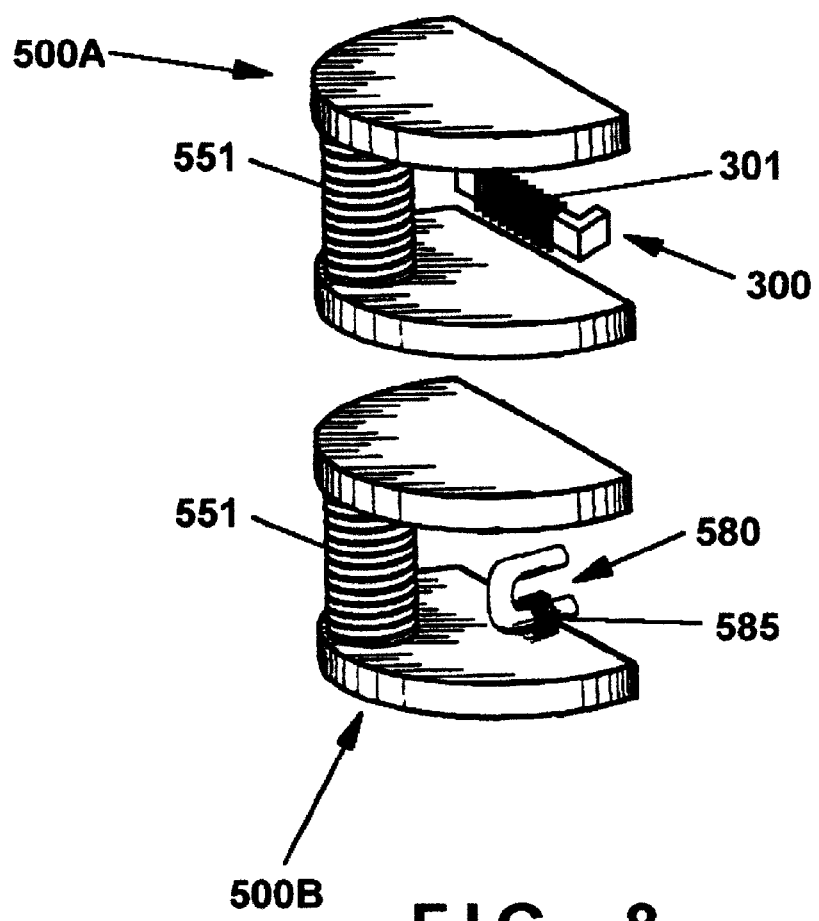
FIG. 8 is another example of the orientation of inducers for the present invention where the transmitter and the receiver coils are at an orientation of 90° with respect to the saturating coils.

FIG. 8 illustrates the orientation of a first inducer 500A and second inducer 500B in the associated saturated coil 551 and the transmitter 300 and the receiver 500. The transmitter coil 301 and the receiver coil 585 are oriented to be at 90°0 with respect to the saturating coils 551.

4. Possible Spatial Distributions and Locations Magnetic Transparency

Each different application for various problems will have a unique spatial distribution of the magnetic transparency. A few of those many possible are shown in FIGS. 11, 12, 13 and 14. Therefore, any geometrical combination of transmitters and receivers may be used. Directionality is achieved by creating a transparency in front of different transmitters and receiver combinations to either transmit directionally, receive directionally or perform both with transmitters combined with various receivers. The unsaturated sections that are turned off provide excellent signal damping and nulling for the receiver or transmitter. These time variations of the transparency are discussed herein.

Figure 11:
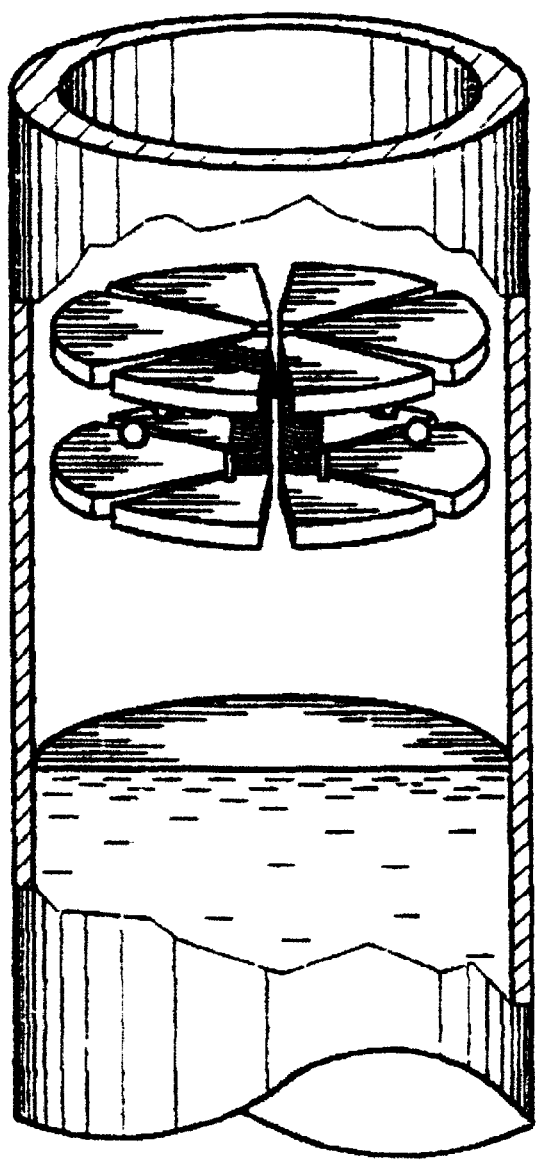
FIG. 11 is an example of one embodiment of the present invention for directional logging to find resistivity of cement around a casting using transmitter/receiver pairs geometrically nulled by 90° rotation in a magnetically saturated section.

FIG. 11 is an example of one embodiment of the present invention for directional logging to find resistivity of cement around a casting using transmitter/receiver pairs geometrically nulled by 90° rotation in a magnetically saturated section.

Figure 12:
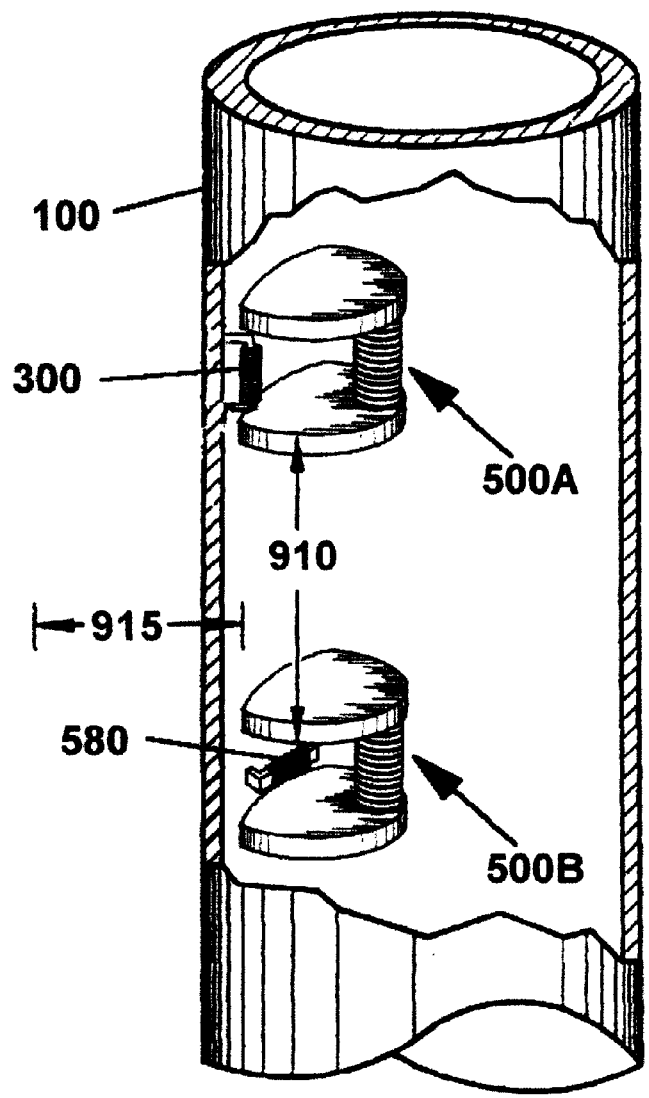
FIG. 12 is yet another embodiment of the present invention illustrating the use of the invention for profile logging with a separated transmitter and receiver.

FIG. 12 is yet another embodiment of the present invention illustrating the use of the invention for profile logging with a separated transmitter and receiver. FIG. 12 is yet another bi-static embodiment of the present invention illustrating the use of the invention for profile logging with the transmitter coil 300 separated from the receiver coil 580 incorporated into an individual transmitter 500A and an individual receiver 500B, respectively. The effective signal penetration 915 will be a function of the distance 910 between the transmitter 500A and the receiver 500C. It will be appreciated that the transmitter 500A and the receiver 500B respectively, and not attached to the barrier material 100.

Figure 13:
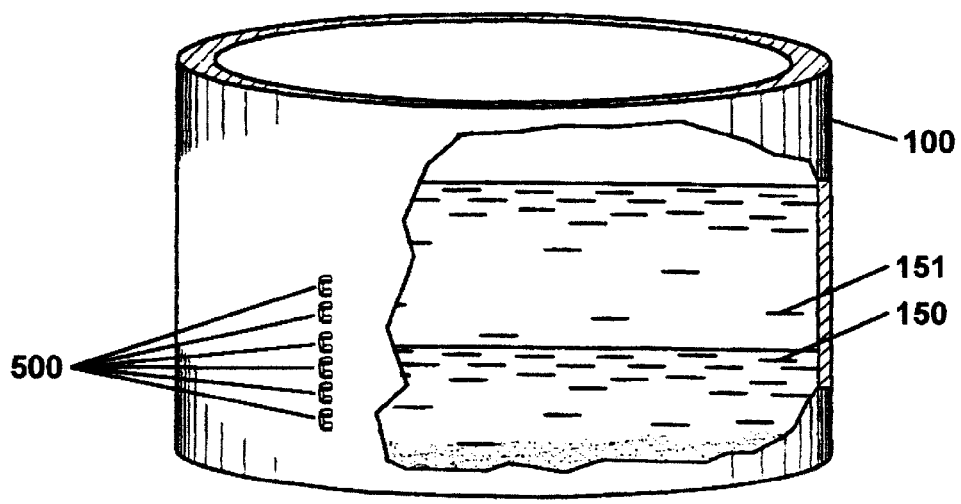
FIG. 13 illustrates another application of the present invention associated with the measurement of sediment and water in a storage tank illustrating the placement of transmitter/receiver pairs on the outside of the tank for measuring sediment and water.

FIG. 13 illustrates another application of the present invention associated with the measurement of sediment and water 150 in a hydrocarbon storage tank 100 illustrating the placement of transmitter/receiver pairs on the outside of the tank 100 for measuring sediment and water 150.

Figure 14:
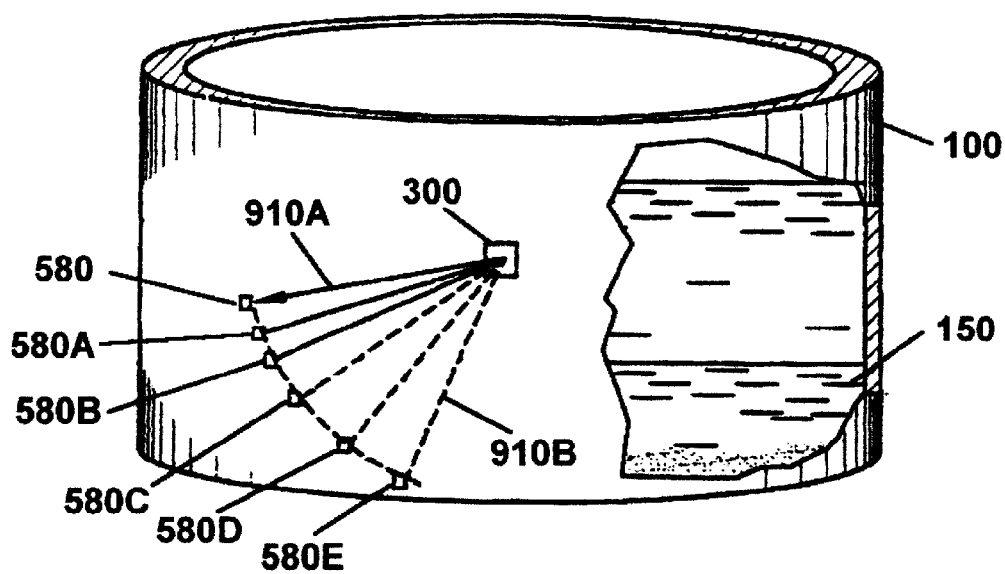
FIG. 14 illustrates yet another embodiment of the present invention for the measurement of sediment and water wherein the transmitter is in association with a polarity of fixed receivers at equal distances from the transmitter and located outside the tank such that resistivities change as the transmitter/receiver signal changes.

FIG. 14 illustrates yet another embodiment of the present invention for the measurement of sediment and water 150 wherein the transmitter 300 is in association with a plurality of fixed receivers 580, 580A, 580B, 580C, 580D, 580E at equal distances 910 from the transmitter and located outside the tank 100 such that resistivities change as the transmitter/receiver signal changes.

5. Possible Temporal Variations in opening and closing the Magnetic Transparency These are the following considerations for the temporal variation of the saturation of a section of material in front of a transmitter or receiver.

Figure 15:
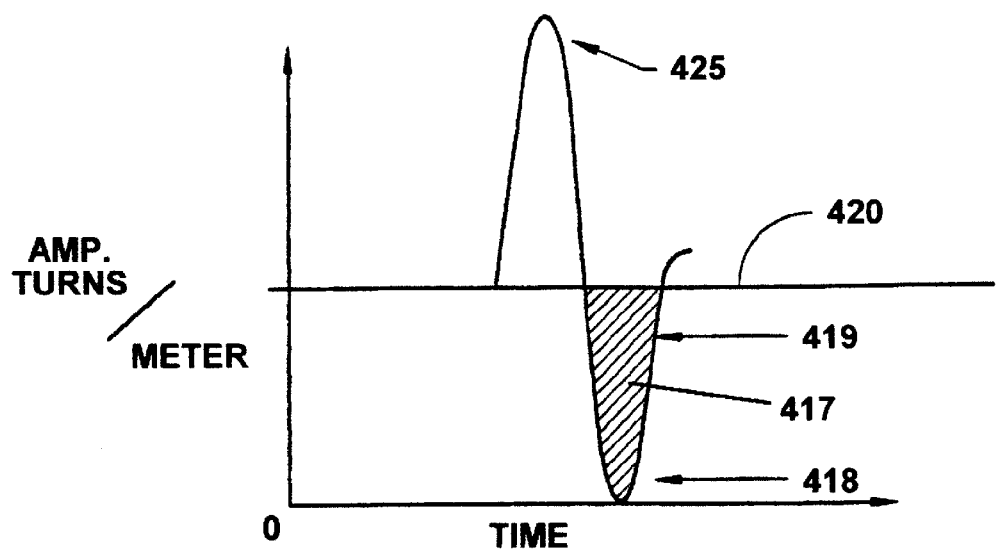
FIG. 15 is one embodiment of a damping AC signal illustrating the saturation current for steel casting.

1. Can use the material as an under-damping device for transmitting pulses for a pseudo-noise radar or reservoir mapping.
2. The material being saturated can be used as a band pass filter.
3. Can use temporal pairing for directionality measurements as discussed above.
4. Rapid on and off pulsing of the saturating magnets allows the ferromagnetic material to be a gate for transmitting signals or receiving signals. In the transmitting example, the whole magnetizing current can be used as a transmitter. This means the total saturated area becomes a transmitting antenna. Each of these considerations are discussed.
   (A) The magnetic transparency can be used as an under damping device. In FIG. 15, the result of the superposition of a strongly varying AC pulse 419 on the steady state DC saturating current 423 is shown. The shaded area shows the region where the steel is coming out of saturation. This means the permeability is more than one and the EM losses are greater. This higher permeability acts as a powerful damping mechanism on the pulse 419. This is very useful in truncating a transmitted single wave so that the transmitter does not cause "ringing." This ringing or oscillation at the end of the transmitter pulse can obliterate nearby readings. The damping effect is shown at 418 and occurs within the shaded area 417 The damping can cause the transparency to close or create only a partial transparency. In this manner, the oscillating wave can act as a switch turning the transparency "on and off." At the peak 425 of the pulse 419, the transparency may be open and the oscillating signal or pulse 419 will be transmitted across the barrier material.
   (B) The saturation current may be manipulated in such a way that the transparences are open as a band pass filter. This means that the ferromagnetic material can be used to allow only a certain transfer function of a transmitted wave form into the receiver. For example, in the logging application knowing that the presence of a 1 ohm meter material causes the transmitted frequency to distort in a certain manner (the transfer function) will allow the saturation current in the receiver section to be oscillated with the desired wave form of the transfer function reflected transmitted wave. In this way, the casing would transmit only the desired waveform to the receiver placed in a different location from the transmitter. This casing use can be much more sophisticated than a simple band pass filter.

For a diode, the current needed to put a material into magnetic saturation is called saturation current. If another current pulse is superimposed on saturation current, the additive part of the pulse will be transmitted, but the negative part of the pulse will reduce the total current below the saturation current. This negative part of the pulse will be severely damped by the metal because it is no longer magnetically saturated.

- (C) Directional or spatial information can be obtained by having sections of a steel wall equipped with saturating coils. In this way directionality may be obtained by either creating a transparency in front of different transmitters, receivers, or any combination of the two.
- (D) Combining directionality with the ability to gate electronically the opening and closing of the transparency is another possibility. This gating would also cause the receiver transparency to be off during a pulse from the transmitter, then open after a delay that would correspond to more distant signals returning. This would be an important part of a pulsed radar system with the gating preventing or allowing, as desired, the near reflections to enter the receiver. Since the gating delays can be changed, in reality different parts of the reservoir are being sampled. Because the wavelengths are so long, this gating could be the most useful for long distance mapping of reservoirs.

6. Nulling Techniques to Eliminate Direct Signal Coupling:

The direct coupling between the transmitter and receiver is strong enough to overwhelm a secondary signal due to induced eddy currents. Therefore, a nulling technique must be used to decouple the transmitter receiver. There are three (3) ways to accomplish this nulling. These are as follows:

a. Geometric nulling of the transmitter receiver by orientation.

b. Separation of transmitter-receiver by unsaturated metal.

c. Electronic simple nulling of a waveform 180 degrees phase difference and matching amplitude, or by digital means.

Each of these is used singly or in combination in the devices used in magnetic transparency.

7. Controlled Partial and Temporal Reduction in Permeability:

Because the saturating current can be time and intensity variable it is possible to selectively damp a generated or received waveform in frequency and amplitude. In particular, a transmitted pulse has many characteristics that may be desirable to selectively damp in time and possibly space. This can be accomplished fairly easily by modulating the saturation current with a complimentary waveform to the transmitter waveform, the net addition of which would yield the desired shape.

What is claimed is:

1. A method for creating a transparency in a first material so that a second material can be evaluated, the method comprising the steps of:
   (a) lowering the permeability of the material with an initial electromagnetic wave,
   (b) creating a transmitted electromagnetic wave adjacent to the material having a frequency higher than the initial electromagnetic wave,
   (c) engaging the transmitted electromagnetic wave with, at least one of, the material or another material for creating a resulting wave, and
   (d) detecting the resulting wave for creating a received signal that has a geometircally nulled relationship to the transmitted wave, and
   (e) evaluating the received signal to determine the characteristics of, at least one of, the material or another material.

2. The method for creating a transparency in a first material so that a second material can be evaluated defined in claim 1 wherein the step of geometrically nulling comprises creating the transmitted wave so as to prevent coupling with the received signal.

3. The method for creating a transparency in a first material so that a second material can be evaluated defined in claim 1 wherein the step of making the resulting wave available for detection so as to create a received signal that has a nulled relationship to the transmitted wave comprises separation nulling.

4. The method for creating a transparency in a first material so that a second material can be evaluated defined in claim 3 wherein the step of separation nulling comprises separating the creation of the transmitted electromagnetic wave and the detection of the received signal with, at least one of, unsaturated material, high permeability material and ferromagnetic material.

5. The method for creating a transparency in a first material so that a second material can be evaluated defined in claim 1 wherein the step of making the resulting wave available for detection so as to create a received signal that has a nulled relationship to the transmitted wave comprises electronic nulling.

6. The method for creating a transparency in a first material so that a second material can be evaluated defined in claim 5 wherein the step of electronic nulling comprises nulling the transmitted electromagnetic wave and the received signal by degrees of phase.

7. The method for creating a transparency in a first material so that a second material can be evaluated defined in claim 5 wherein the step of electronic nulling comprises nulling the transmitted electromagnetic wave and the received signal by amplitude.

8. The method for creating a transparency in a first material so that a second material can be evaluated defined in claim 5 wherein the step of electronic nulling comprises nulling the transmitted electromagnetic wave and the received signal by degrees of phase and amplitude.

9. The method for creating a transparency in a first material so that a second material can be evaluated defined in claim 1 wherein the step of nulling comprises minimizing direct signal coupling between the transmitted electromagnetic wave and the received signal.

10. The method for creating a transparency in a first material so that a second material can be evaluated defined in claim 1 wherein the step of lowering the permeability of the material with an initial electromagnetic wave comprises using a range of frequencies above zero.

11. The method for creating a transparency in a first material so that a second material can be evaluated defined in claim 1 wherein the step of lowering the permeability of the material with an initial electromagnetic wave comprises using a DC wave for the initial electromagnetic wave.

12. The method for creating a transparency in a first material so that a second material can be evaluated defined in claim 1 wherein the step of lowering the permeability of the material with an initial electromagnetic wave comprises using an AC wave for the initial electromagnetic wave.

13. The method for creating a transparency in a first material so that a second material can be evaluated defined in claim 1 wherein the step of evaluating the received signal to determine the characteristics of the material comprises determining the resistivity of the material.

14. The method for creating a transparency in a first material so that a second material can be evaluated defined in claim 1 wherein the step of evaluating the received signal to determine the characteristics of the material comprises detecting fluid interfaces in tanks.

15. A method for creating a transparency in a material comprising the steps of:
   (a) lowering the permeability of the material with an initial electromagnetic wave,
   (b) creating a transmitted electromagnetic wave adjacent to the material having a frequency higher than the initial electromagnetic wave,
   (c) engaging the transmitted electromagnetic wave with, at least one of, the material or another material for creating a resulting wave, and
   (d) making the resulting wave available for detection so as to create a received signal that has a geometrically nulled relationship to the transmitted wave.

16. The method for creating a transparency in a material defined in claim 15 wherein the step of geometrically nulling comprises creating the transmitted wave so as to prevent coupling with the received signal.

17. The method for creating a transparency in a first material so that a second material can be evaluated defined in claim 1 wherein the step of evaluating the received signal to determine the characteristics of the material comprises determining a flow rate.

18. The method for creating a transparency in a material defined in claim 15 wherein the step of making the resulting wave available for detection so as to create a received signal that has a nulled relationship to the transmitted wave comprises separation nulling.

19. The method for creating a transparency in a material defined in claim 18 wherein the step of separation nulling comprises separating the creation of the transmitted electromagnetic wave and the detection of the received signal with, at least one of unsaturated material, high permeability material and ferromagnetic material.

20. The method for creating a transparency in a material defined in claim 16 wherein the step of making the resulting wave available for detection so as to create a received signal that has a nulled relationship to the transmitted wave comprises electronic nulling.

21. The method for creating a transparency in a material defined in claim 17 wherein the step of electronic nulling comprises nulling the transmitted electromagnetic wave and the received signal by degrees of phase.

22. The method for creating a transparency in a material defined in claim 20 wherein the step of electronic nulling comprises nulling the transmitted electromagnetic wave and the received signal by amplitude.

23. The method for creating a transparency in a material defined in claim 20 wherein the step of electronic nulling comprises nulling the transmitted electromagnetic wave and the received signal by degrees of phase and amplitude.

24. The method for creating a transparency in a material defined in claim 16 wherein the step of nulling comprises minimizing direct signal coupling between the transmitted electromagnetic wave and the received signal.

25. The method for creating a transparency in a material defined in claim 16 wherein the step of lowering the permeability of the material with an initial electromagnetic wave comprises using a range of frequencies of zero and above.

26. The method for creating a transparency in a material defined in claim 16 wherein the step of lowering the permeability of the material with an initial electromagnetic wave comprises using a DC wave for the initial electromagnetic wave.

27. The method for creating a transparency in a material defined in claim 16 wherein the step of lowering the permeability of the material with an initial electromagnetic wave comprises using an AC wave for the initial electromagnetic wave.

* * * * *